United States Patent [19]
Mark et al.

[11] Patent Number: 6,092,965
[45] Date of Patent: Jul. 25, 2000

[54] BORING TOOL

[75] Inventors: Fritz Mark, Mäder, Austria; Benno Büchel, Ruggell, Liechtenstein; Peter Ostermeier, Diessen; Goran Golubovic, Munich, both of Germany

[73] Assignee: Hilti Aktiengesellschaft, Schaan, Liechtenstein

[21] Appl. No.: 09/152,859

[22] Filed: Sep. 14, 1998

[30]     Foreign Application Priority Data

Sep. 15, 1997 [DE]  Germany .............................. 197 40 462

[51] Int. Cl.[7] .............................. B23B 45/00; B23B 47/04
[52] U.S. Cl. ........................... 408/124; 408/17; 408/180; 408/187
[58] Field of Search .................................. 279/6; 408/124, 408/159, 180, 187, 188, 17, 236

[56]     References Cited

U.S. PATENT DOCUMENTS

| | | | |
|---|---|---|---|
| 4,594,033 | 6/1986 | Peetz et al. | 408/180 |
| 5,285,598 | 2/1994 | Arita et al. | 408/1 R |
| 5,316,419 | 5/1994 | Bohnet et al. | 408/236 |
| 5,544,989 | 8/1996 | Erath | 408/159 |
| 5,702,212 | 12/1997 | Erath et al. | 408/159 |

*Primary Examiner*—Steven C. Bishop
*Attorney, Agent, or Firm*—Brown & Wood, LLP

[57]     ABSTRACT

A boring tool, including a housing part (3), a fisture (35) for transmitting a rotational movement to a borer, the transmitting fixture (35) being supported in the housing part and having a central receiving region (36) for receiving the borer (4), two, spaced from each other, bearing members (33, 34) for supporting the transmitting element (35) in the housing part (3), and an arrangement for enabling inclination of a longitudinal axis of the borer (4) relative to the housing part (3).

5 Claims, 4 Drawing Sheets

BORING TOOL

BACKGROUND OF THE INVENTION

1. Field of the Invention

The present invention relates to a boring tool and, in particular, to a hand-held boring tool having a housing part, means for transmitting a rotational movement to a borer, with the transmitting means being supported in the housing part and having a central receiving region for receiving the borer, and two, spaced from each other, bearing members for supporting the transmitting means in the housing part.

2. Description of the Prior Art

For forming bores in hardened structural components for attachment anchors or for passing tubes therethrough, boring tools which are employed with borers equipped with diamond bits, are used. Such a boring tool is disclosed, e.g., in German Patent No. 3,434,261. The known boring tool includes an electrical drive unit and a borer receiving fixture. The borer receiving fixture has a central receiving region for receiving the borer shank and is supported in a housing part with two, spaced from each other, bearing members. In the known boring tool, both the longitudinal axis of the borer receiving fixture and the longitudinal axis of the borer are arranged coaxially with the longitudinal axis of the housing part. In the boring tools and, in particular, in the handheld boring tools, because of the required high pressure forces and a relative long time, necessary for forming a bore, the borer is subjected to high stresses. The pressure forces are distributed over the entire end surface of the cutting region of the borer facing in the bore-forming direction so that only a small surface pressure is achieved, and the projecting diamonds penetrate into the structural component to a small degree and can be stripped off. Because of their small penetration into the structural component, the diamond tips become rounded, and the entire boring process worsens. The boring speed is very low.

Accordingly, an object of the present invention is a boring tool with which higher boring speeds can be achieved while the applied pressure force is small.

SUMMARY OF THE INVENTION

This and other objects of the present invention, which will become apparent hereinafter, are achieved by inclining the longitudinal axis of the borer relative to the housing part during the boring process. The solution according to the present invention permits to impart to the borer a tilting or a wobbling movement at least at one of the opposite ends of the borer. From time to time, the longitudinal axis of the borer becomes inclined toward the longitudinal axis of the housing part. Due to this inclination, a portion of the end surface of the borer, which faces in the bore-forming direction, is lifted off the structural component, and only a portion of the bored region of the structural component is subjected to boring. Therefore, the pressure force acts on a smaller cutting surface, which provides for a higher surface pressure. This results in an effective boring, permits to increase the boring speed and to reduce the time of boring, and increases the idle time of the borer. A one-sided lifting of the cutting region off the structural component improves the rinsing, with the cooling medium, the operational portion of the borer and facilitate the removal of the cut-off material of the structural component.

The borer receiving fixture can be formed, e.g., as a sleeve in which the shank of the borer is axially fixed. The shank can be surrounded by, e.g., at least one support or bearing member against which the shank is supported. In order to provide for inclination of the longitudinal axis of the borer relative to the longitudinal axis of the housing part, the at least one bearing member can be inclined relative to the longitudinal axis of the housing part. This bearing member can have a receiving opening for the borer shank and the longitudinal axis of which can be inclined relative to the longitudinal axis of the housing part.

When two, spaced from each other, bearing members are provided for supporting the borer shank, the receiving openings of both bearing members are coaxially aligned but can be inclined relative to the longitudinal axis of the housing part. The sidewise support of the shank can be effected with an elastic bearing member, with the load, which is applied to the borer during forming a bore in a structural component, causing deformation of the elastic bearing member which results in the inclination of the longitudinal axis of the borer relative to the longitudinal axis of the housing part. The inclination leads to a tilting or wobbling movement of the borer during which a portion of the cutting region of the borer, which faces in the bore-forming direction, is lifted of the surface of the structural component. During boring of the structural component, tilting or wobbling of the borer can be effected, e.g., constantly or selectively turn on and off during the boring process. The degree of the tilting or wobbling movement depends on a load applied to the borer, e.g., on the applied pressure force and the power of the drive unit of the boring tool.

Tilting or wobbling movement of the borer can be achieved, e.g., by inclining the longitudinal axis of the borer receiving fixture, together with the longitudinal axis of the borer, relative to the longitudinal axis of the housing part. The shank of the borer is secured in the receiving region of the borer receiving fixture for joint rotation with the fixture, and the longitudinal axis of the borer extends coaxially with the longitudinal axis of the receiving region of the fixture.

Preferably, the longitudinal axis of the receiving region of the borer receiving fixture is inclined relative to the longitudinal axis of the housing part by offsetting at least one of the bearing members, which support the fixture against the housing part, in a direction transverse to the longitudinal axis of the housing part. Thus, when, e.g., a bearing member, which is provided at a side of the housing part facing in the bore-forming direction, is offset in a direction transverse to the longitudinal axis of the housing part, with the other bearing member remaining coaxial with the housing part, the tilting or wobbling movement of the end of the borer, which faces in the bore-forming direction, is largest. When, e.g., it is the bearing member, which is provided at the side of the housing part facing in the bore-forming direction, remains coaxial with the housing part, and the opposite bearing member is offset transverse to the longitudinal axis of the housing part, then the first bearing member forms a pivot point, whereby a tilting or wobbling movement is imparted to the borer. When, e.g., both bearing members are offset in a direction transverse to the longitudinal axis of the housing part, and the bearing member, which is provided at the side of the housing part facing in the bore-forming direction, is offset by a smaller amount than the other, opposite bearing, then the tilting or wobbling movement of the borer is effected about an imaginary pivot point which is formed by the end of the borer facing in the bore-forming direction. This means that the end of the borer facing in the bore-forming direction is not subjected to any tilting or wobbling movement, and the opposite end of the borer has a greatest tilting or wobbling movement. In order for the tilting or wobbling movement of the borer be dependent only on the load applied to the borer, the offset of the bearing member or members is advantageously effected with at least one elastic intermediate member cooperating with one of the bearing members. The elastic intermediate member can be arranged, e.g., between the one bearing member and the borer receiving fixture or between the one bearing member and the housing part. In order to be able to incline the longitudinal axis of the borer receiving fixture relative to the longitudinal axis of the housing part substantially transverse to the longitudinal axis of the housing part, the bearing member, which is provided at the side of the housing part facing in the Core-forming direction, is connected with a swing bearing, with the opposite bearing member being connected with an elastic intermediate member. The swing bearing can be formed, e.g., of two, engaging each other, rings which rotate in opposite in opposite directions. It is, of course, possible to connect the first-mentioned bearing with the elastic intermediate member and to connect the opposite member with the swing bearing.

In order to be able to achieve a predetermined wobbling movement, preferably, at least one offsetting member is provided for offsetting the bearing member. The offsetting member is arranged, e.g., between the bearing member and the housing part. The offsetting member, e.g., can be formed of two, engaging each other, eccentric rings which effect a sidewise displacement of the associated bearing member upon being rotated in opposite directions.

The offsetting member can be arranged between the bearing member and the borer receiving fixture or between the bearing member and the housing part. In order to be able to achieve the inclination of the longitudinal axis of the fixture substantially transverse to the longitudinal axis of the housing part, the bearing member, which is located at the side of the housing part facing in the bore forming direction, is connected with the offsetting member, and the opposite bearing member is connected with the swing bearing. The swing bearing can be formed, of two, engaging each other rings pivotable in opposite directions. It is, of course, possible to connect the first of the above-mentioned bearing members with the swing bearing, and the opposite bearing member with the offsetting member. Also, each of the bearing members can be connected with an offsetting member.

In order to be able to increase the boring speed and to prevent a contact of the borer with the bore wall, preferably, the longitudinal axis of the borer is inclined relative to the longitudinal axis of the housing part at an angle from 0.1° to 5°

In order to be able to achieve a wobble rotational speed which, e.g., differs from the rotational speed of the rotational movement of the borer receiving fixture or the borer, preferably, an intermediate sleeve is rotatably arranged between the bearing members and the housing part, with the intermediate sleeve being provided with rotatable engagement means. The intermediate sleeve is supported in the housing part by two, axially spaced from each other, bearings. Due to the support of the borer receiving fixture according to the present invention, it is possible to effect wobbling movement in a direction opposite to the regular rotational movement of the borer. The rotatable engagement means is formed, e.g., as a tooth gear which is driven by the drive unit of the boring tool.

Based on technological considerations, advantageously, the speed of the intermediate sleeve is not synchronous with the speed of the borer receiving fixture. The rotational speed of the intermediate sleeve can be smaller than that of the fixture.

The transmission of a rotational movement from the borer receiving fixture of the borer is advantageously effected by receiving means insertable in the fixture and connectable with the end of the support body of the borer remote from the cutting region. The receiving means extend radially beyond the support body. When, e.g., the longitudinal axis of the receiving region of the fixture is coaxial with the longitudinal axis of the housing part, and a free, automatic tilting or movement of the borer need be implemented, the receiving means can be formed, e.g., of an elastic material. As an elastic material, rubber can be used. When the rubber material is used, the rubber is vulcanized onto the end of the borer support body which is remote from the borer cutting region. when the tilting or wobbling movement is effected by an arrangement, with which the longitudinal axis of the receiving region is inclined toward the longitudinal axis of the locating part, the receiving means can be formed of a non-elastic material, e.g., of a plastic material which is extrusion-coated onto the end of the borer support body remote from the cutting region. Magnesium also can be used for forming the receiving means in this case.

If the support body of the borer is formed as a tubular body, an additional, form-locking connection of the elastic or non-elastic material with the tubular support body is possible. To th is end, the support body is provided on its outer surface in the shank region with indentations or through-bores into which the material of the receiving means or the receiving member penetrate when this material is applied to the shank by vulcanization or extrusion-coating. However, the present invention does not exclude other then described above materials for the receiving means and/or methods of its connection with the shank.

The boring tool according to the present invention can be produced both as a hand-held tool so as a tool supported on a stand. The drilling of a bore with the inventive boring tool can be effected both as wet drilling and as dry drilling. To achieve better results, in addition to the already mentioned borer crown, a diamond-impregnated hard metal borer or a steel borer, such as borer made of super speed steel can be used. The principle of using the tilting or wobbling movement can also advantageously be applied to treatment of the structural components with parting-off tools or saws. This principle can also be applied to treatment of the surface with a pot-shaped disc.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENTS

Figure 1:
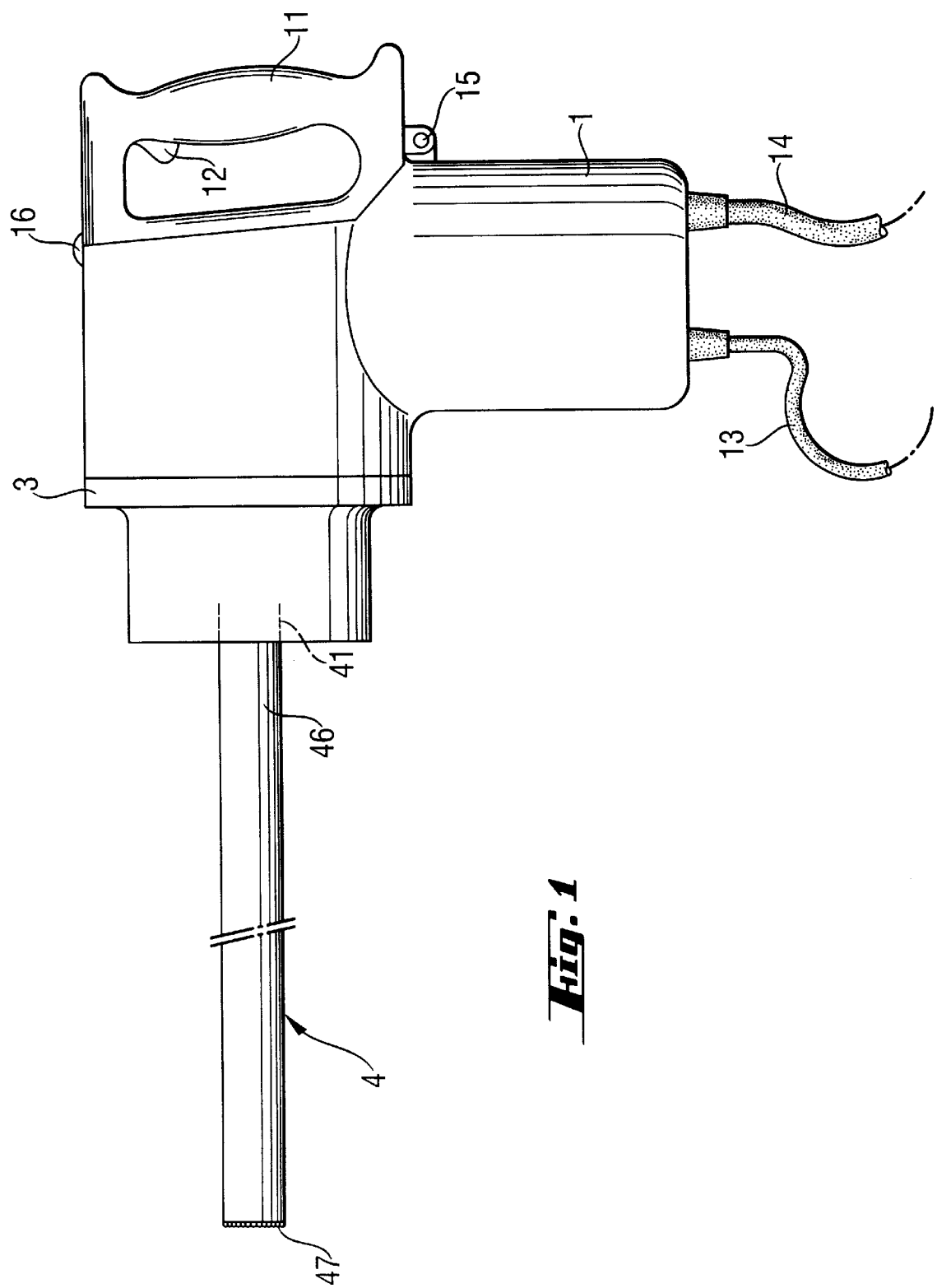
FIG. 1 shows a schematic view of a hand-held boring tool according to the present invention with an inserted borer.

In the drawings, the same elements are designated with the same reference numeral.

A boring tool according to the present invention, which is shown in FIG. 1, includes a housing 1, a drive unit (not shown), which is located in the housing 1, a handle 11, an actuation trigger 12 integrated in the handle 11, a cooling medium conduit 14, an electrical conductor 13, a front housing part 3, and a borer 4 projecting form the housing part 3. The borer 4 has a support body 46 one free end of which is provided with a shank 41, with the other free end of the support body 46 being provided with an annular cutting body 47. The handle 11 is arranged on the housing 1 directly opposite to the borer 4. The attachment of the handle 11 to the housing 1 is effected with a hinge 15 and a lock 16 arranged substantially opposite to the hinge 15. The hinge 15 provides for pivoting of the handle 11 at least out of an axial projection surface of the tool 4.

Figure 2:
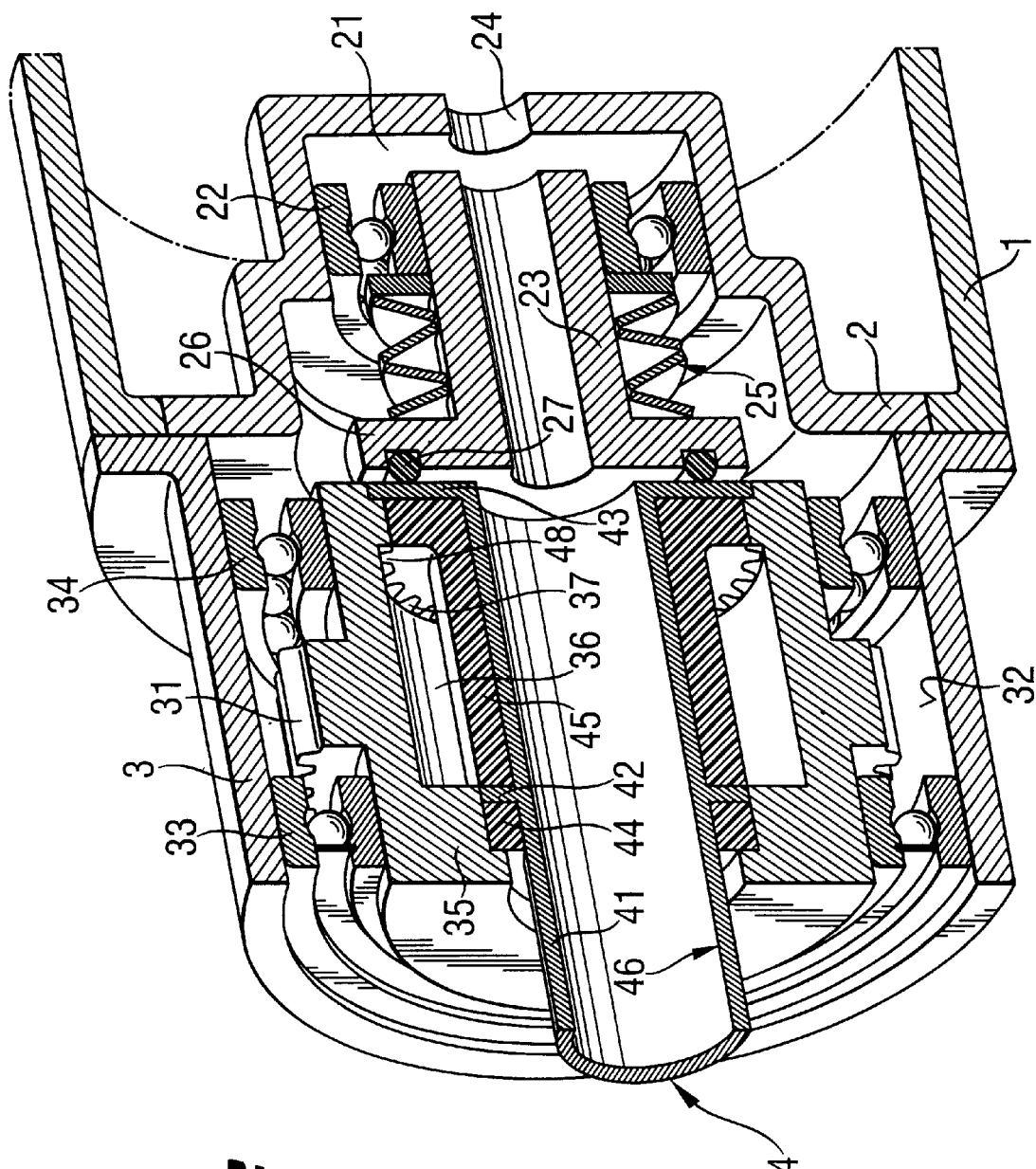
FIG. 2 shows a partial cross-sectional view of a region of the boring tool shown in FIG. 1 facing in a bore-forming direction, at an increased scale, with an inclination of the borer relatively to the borer receiving fixture being achieved with two elastic support members provided between the borer and the borer receiving fixture.
Figure 3:
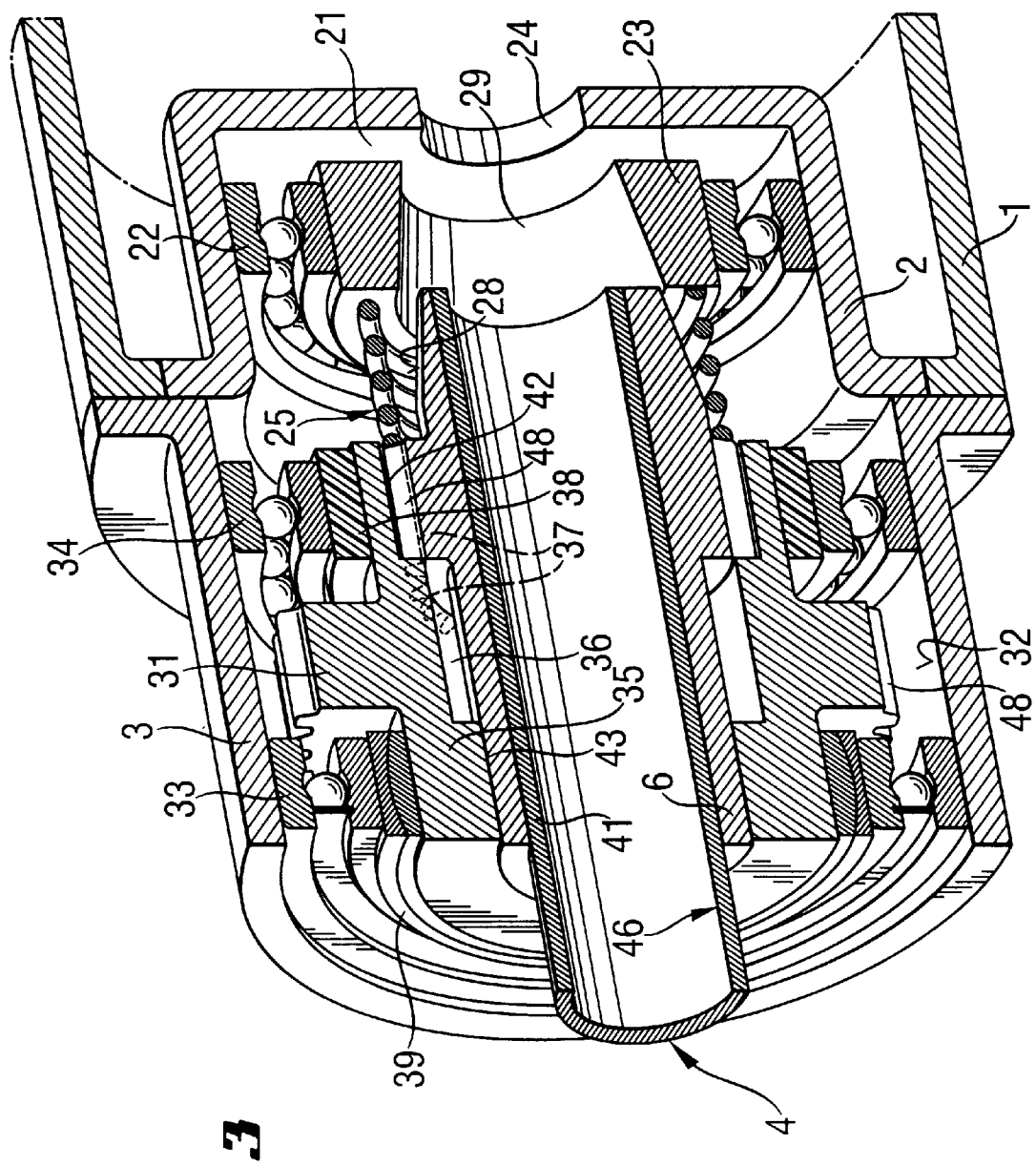
FIG. 3 shows a partial cross-sectional view of a region of another embodiment of a boring tool according to the present invention and facing in the bore-forming direction, with the inclination of the borer receiving fixture relative to the tool housing being achieved with an intermediate elastic member arranged in the region of a support.

FIGS. 2 and 3 show a cross-sectional view of the housing part 3 having, at its free end remote from the borer 4, a flange-shaped portion which is connected to the housing 1 with connection elements (not shown). The housing part 3 has a tubular shape and has an inner wall 32 on which are supported two, spaced from each other, bearing members 33, 34 formed as ball bearings. The inner rings of the ball bearings 33, 34 are connected with a substantially sleeve-shaped borer receiving fixture 35. The central receiving region 36 of the fixture 35 is step-shaped with a reduced diameter in the bore-forming direction. The central receiving region 36 has, at its end region opposite to the bore-forming direction, a circumferential inner shaped profile formed as inner toothing.

A rotatable engagement member 31, which is formed as a tooth gear, is located between the two bearing members 33 and 34. The rotatable engagement member 31 is secured to the borer receiving fixture 35 for joint rotation therewith. The outer profile of the rotatable engagement member 31 is operatively connected with the drive unit which, as it has already been mentioned above, is not shown in the drawings. The rotatable engagement member 31 serves for transmission of a rotational movement, which is produced by the drive unit, to the borer receiving fixture 35 and to the borer 4 received in the fixture 35.

The central receiving region 36 receives the shank 41 of the borer 4. The outer diameter of the tubular support body 46 is smaller than the smallest diameter of the central receiving region 36 of the borer receiving fixture 35.

A cover 2, which closes the housing part 3 from a side of the housing part 3 opposite to the bore-forming direction, has an inner receiving region 21 which widens stepwise in the bore-forming direction. The cover 2 has a central through-opening 24 which serves for feeding of the cooling medium and which is connected with the cooling medium conduit 14 shown in FIG. 1. The connection of the through-bore 24 with the cooling medium conduit 14 is not shown in the drawings.

The cover 2 can be axially supported, e.g., by the handle 11 which, in a closed position, is pressed against at least one surface of the cover 2 facing away from the bore-forming direction. The cooperation of the handle 11, which is shown in FIG. 1, with the cover 2 is not shown in the drawings. The cover 2 can be formed, e.g., as part of the handle 11 so that the cover 2 can be moved away of the housing part 3 when the handle 11 is pivoted to its open position and unblocks the axial projection surface of the borer 4, so that, e.g., a drilling core can be removed from the borer 4 or the borer 4 itself can be removed from the borer receiving fixture 35 in a direction opposite to the bore-forming direction.

As shown in FIG. 2, the borer receiving fixture 35 has a first cylindrical section located between its inner profile 37 and its free end opposite to the bore-forming direction. A second cylindrical section of the bore receiving fixture 35 is formed by a portion of the receiving region and has a smaller inner diameter than the mentioned first cylindrical surface.

In a spaced relationship to both of the cylindrical sections, which define the central receiving region 36, disc-shaped guide members 42, 43 are provided on the tubular support body 46. One of the guide members, the guide member 43, has an outer diameter which substantially corresponds to the inner diameter of the first cylindrical section of the central receiving region 36. The other guide member 42 has an outer diameter which substantially corresponds to the inner diameter of the second cylindrical section.

The tubular support body 46 is surrounded by an elastic support member 45 arranged between the two guide members 42, 43. A portion of the support member 45 has an outer profile 48 corresponding to the inner profile 37 of the receiving region 36 of the borer receiving fixture 35. A second elastic support member 44 adjoins the other guide member 42 at its side facing in the bore-forming direction. The outer diameter of the second elastic support member corresponds substantially to the outer diameter of the other guide member 42.

A ball bearing 22 is arranged in the inner receiving region 21 of the cover 2. The ball bearing 22 rotatably supports and axially guides a support member 23. The support member 23 has a shaft portion which extends through the inner ring of the bearing 22. The side of the support member 23, which faces in the bore-forming direction, has a flange-shaped portion 26. A spring member 25 is located between the flange-shaped portion 26 of the support member 23 and the bearing 22. The spring member 25 is formed of a plurality of plate springs. The support member 23 has a central bore which conducts the cooling medium to the borer 4. On the side of the bearing 22 facing in a direction opposite to the bore forming direction, a seal can be provided to prevent the cooling medium, which flows through the bore 24, from reaching the bearing 22. A circumferential indentation is provided on the end surface of the flange-shaped portion 26 facing in the bore-forming direction. Into this indentation, a sealing member 37, which is formed as an O-ring, partially projects. The sealing member 37 prevents the cooling medium, which flows through the central bore of the support member 23 for cooling the borer 4, from reaching the support element 34.

When during an initial stage of a boring process, a small pressure force is applied to the boring tool, the two disc-shaped guide elements 42, 43, which are provided on the support body 46 of the borer 4, center the borer 4 with respect to the borer receiving fixture 35. This means that no uncircular movement of the borer 4 takes place. After the initial stage, the pressure force, which is applied to the boring tool, can be increased. This results in an axial displacement of the borer 4 relative to the borer receiving fixture 35 at least by an amount of an axial extent of one of the two disc-shaped guide members, 42, 43 so that they move out of the respective cylindrical sections of the central receiving region 36 of the borer receiving fixture 35 and are not supported sidewise any more. Because of the load, which is transmitted by the borer 4 to the support members 44, 45, the later become deformed, and an inclination of the borer 4 relative to the borer receiving fixture 35 takes place. The elastic support members 44 and 45 are so designed, that the borer 4 can be inclined with respect to the borer receiving fixture 35 by an angle from 0.1° to 0.8°.

In the embodiment shown in FIG. 3, the borer receiving fixture 35 has three, arranged one after another regions the diameter of which changes with respect to the bore-forming direction stepwise. Two of the regions of the borer receiving fixture 35 are cylindrical. One of these regions with the largest diameter is provided, at its end region facing in a direction opposite to the bore-forming direction, with a toothing inner profile 37.

The shank 41 of the borer 4 is surrounded by a receiving member 6 having three sections. The first section in the bore-forming direction is cylindrical. The outer diameter of the first section corresponds substantially to the inner diameter of the smallest regions of the borer receiving fixture 35. A second section of the receiving member 6, which is located opposite to the first section is formed as an eccentric outer cone 28 tapering in a direction opposite to the bore-forming direction. A third section, which is located between the first and second sections extends radially beyond these two sections and is provided with a toothing-shaped outer profile 48 which form-lockingly cooperates with the inner toothing profile 37 of the borer receiving fixture 35.

The bearing 22, which is provided in the receiving region 21 of the cover 2, rotatably receives the support member 23. The support member 23 has a through-bore with an inner cone 29 widening in the bore-forming direction. The transitional region between the third and second sections is step-shaped. The step forms an annular stop surface against which a spring member 25 formed as a compression spring, is supported. The spring member 25 is supported at its opposite end against an end surface of the support member 23 facing in the bore-forming direction.

The cooling medium, as it has already been discussed above, is led to the borer 4 through the through-bore 24 of the cover 2 and through the bore of the support member 23. At the side of the bearing 22, facing in a direction opposite to the bore-forming direction, as discussed above, a seal (not shown) is provided to prevent the cooling medium, which flows into the interior of the receiving region 21, from penetrating into the bearing 22.

A two-part swing bearing 39 is provided between the ball bearing, which forms the bearing member 33, and the borer-receiving fixture 35. The swing bearing 39 prevents an excessive loading of the ball bearing which forms the bearing member 33, when the fixture 35 becomes inclined relative to the housing part 3. An annular elastic intermediate member 38 is provided between the ball bearing, which forms the bearing member 34, and the fixture 35. The intermediate member 38, upon occurring of large radial forces, becomes deformed, allowing inclination of the fixture 35, together with the borer 4, relative to the housing part 3. The borer 4 is inclined relative to the fixture 35 at an angle from 0.1° to 0.8°. The penetration of the cooling medium into the support member 34 is prevented by a seal (not shown) arranged between the fixture 35 and the support member 23.

During an initial stage of the boring process, a small pressure force is applied to the boring tool, and the borer receiving fixture 35 remains axially aligned with the housing part 3. The elastic intermediate member 38 is not yet deformed and the fixture 35 together with borer 4, remains coaxial with the longitudinal axis of the housing part 3.

After the initial stage, the pressure force can be increased. The increase in the pressure force leads to the displacement of the borer 4 relative to the borer receiving fixture 35 in a direction opposite of the bore-forming direction. This displacement of the borer 4 results in compression of the spring member 25, with the eccentric outer cone 28 of the receiving member 6, which surrounds the shank 41, becoming operationally connected with inner cone 29 of the support member 23. Due to the eccentric arrangement of both cones, a radial force is generated which leads to deformation of the elastic intermediate member 38 and to the inclination of the bore receiving fixture 35, together with the borer 4, relative to the housing part 3. The amount of the deformation of the intermediate member 38 and the resulting inclination of the fixture 35 depends on the applied pressure force. The larger is the pressure force the larger will be the inclination of the fixture 35 and the borer 4 relative to the housing part 3.

Figure 4:
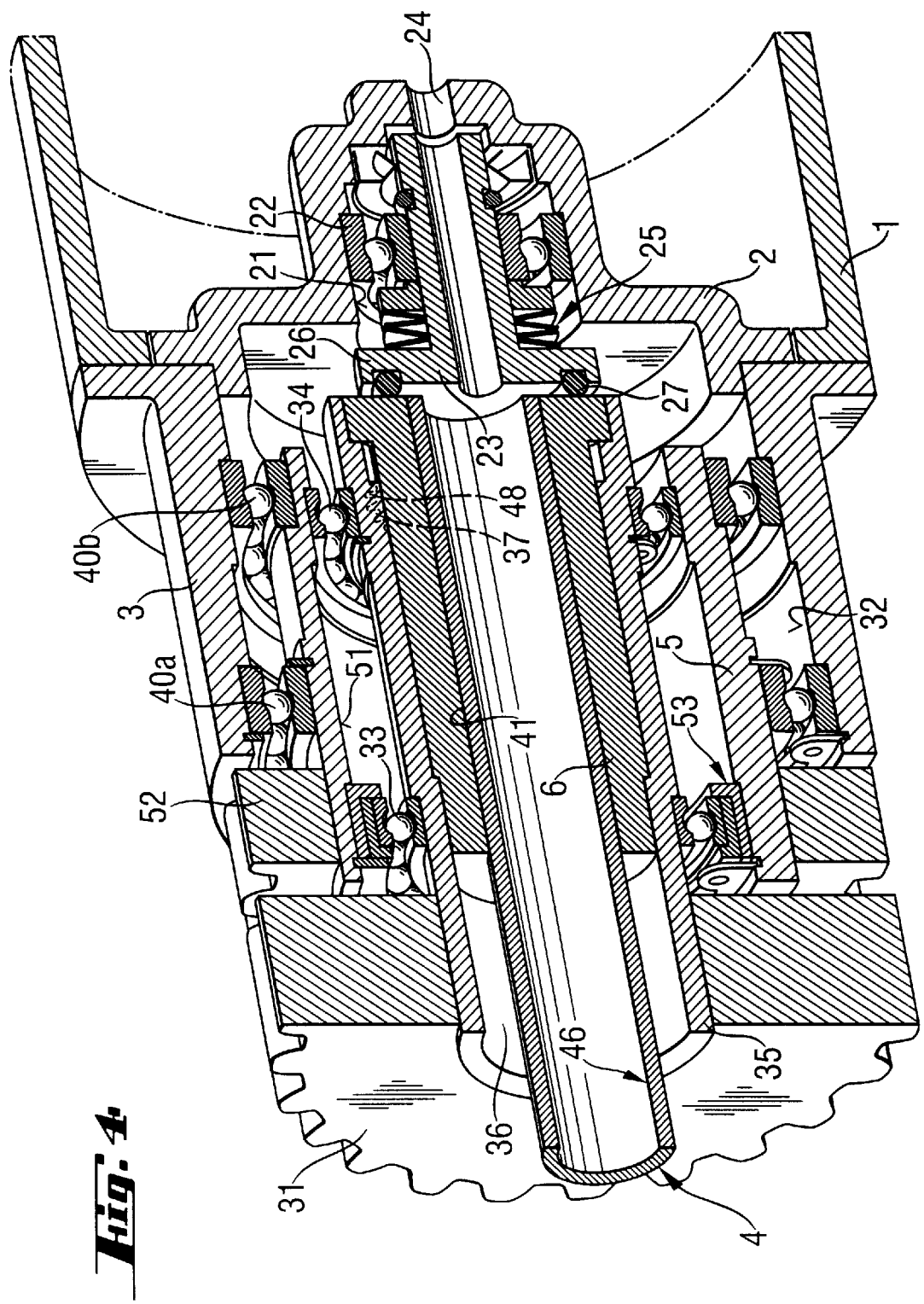
FIG. 4 shows a partial cross-sectional view of a region of a further embodiment of a boring tool according to the present invention and facing in the bore-forming direction, with the inclination of the borer receiving fixture to the tool housing being achieved with an offset member arranged in the support region.

Yet another embodiment of a boring tool according to the present invention is shown in FIG. 4. In FIG. 4, the housing part 3 has at its free rear end a flange-shaped portion with which the housing part is connected with the housing 1 by appropriate connecting means (not shown). The housing part 3 is formed as a substantially tubular part and has an inner wall 32 against which two spaced form each other bearings 40a, 40b, which are formed as ball bearings, are supported. The inner rings of the bearings 40a, 40b are connected with an intermediate sleeve 5 the inner wall 51 of which extends eccentrically to its outer wall. Two bearing members 33, 34, which are formed as ball bearings, are supported against the inner wall 57 of the intermediate sleeve 5. The inner rings of the bearing members 33, 34 are connected with the substantially sleeve-shaped borer receiving fixture 35. An offset member 53, which is formed of two eccentric rings, is arranged between the outer ring of the bearing member 33, which is located at a side of the housing part facing in the bore-forming direction, and the inner wall 51 of the intermediate sleeve 5. The rotation of these two rings in opposite direction determines the inclination of the fixture 35 with respect to the longitudinal axis of the intermediate sleeve 5 and with respect to the housing part 3. This inclination can be from 0.1° to 0.8°.

As shown in FIG. 4, the fixture 35, as in the other embodiments, has a cylindrical receiving region 36 which is step-shaped at its end facing in a direction opposite to the bore-forming direction, with the intermediate step being provided with an inner toothing 37.

The shank 41 of the borer 4 is surrounded by a receiving member 6 which has three sections. The first section, which faces in the bore-forming direction, is cylindrical. The outer diameter of the first section substantially corresponds to the inner diameter of the cylindrical receiving region 36 of the borer receiving fixture 35. The second section, which is opposite to and is spaced from the first section, has a flange-shaped portion having an annular step surface facing in the bore-forming direction. A third section, which is located between the first and second sections has an outer toothing 48 which form-lockingly cooperates with inner toothing 37 of the fixture 35.

The intermediate sleeve 5 projects beyond the housing part 3 in the bore forming direction. A rotatable engagement member 52, which is formed as a tooth gear, is secured on a portion of the outer wall of the intermediate sleeve 5, which projects beyond the housing part 3, for joint rotation with the intermediate sleeve 5.

The borer receiving fixture 35 projects in the bore-forming direction beyond both the housing part 3 and the intermediate sleeve 5. Another rotatable engagement member 31, which is formed as a tooth gear, is secured on a portion of the outer wall of the fixture 35, which projects beyond the intermediate sleeve 5, for joint rotation with the fixture 35.

Both rotatable engagement members 31 and 52 are operatively connected with the drive unit of the boring tool and serve for transmission of at least one rotational movement, which is generated by the drive unit, to the intermediate sleeve 5. The rotational speed of the rotatable engagement member 52, which is mounted on the intermediate sleeve 5, is maximum as high as the rotational speed of the rotatable engagement member 31 mounted on the fixture 35.

The free end of the housing part 3, which faces in a direction opposite to the bore-forming direction, is closed by a cover 2 having step-shaped receiving region 21 with the largest step facing in the bore-forming direction. The end region of the cover 2, remote from the housing part 3, has a central through-opening 24, which is connected with the cooling medium conduit 14, shown in FIG. 1, for feeding the cooling medium to the borer 4. The connection of the opening 24 with the conduit 14 is not shown in the drawings.

The cover 2 is axially supported, at its side remote from the housing part 3, e.g., by the handle 11 which, in its closed position, presses against a surface of the cover 2 facing in a direction. The cooperation of the handle 11 with the cover 2 is not shown in the drawings. The cover 2 can be formed, as it has already been discussed previously when describing other embodiments, as a part of the handle 11, so that the cover 2 can be lifted off the housing, unblocking the axial projection surface of the borer 4, which permits to remove the drilling core from the borer 4 or remove the borer 4 from the bore-receiving fixture 35 at a side of the fixture 35 opposite to the bore-forming direction.

A bearing 22, which is formed as a ball bearing, is located in the receiving region 21 of the cover 2. A support member 23 is rotatably supported in the bearing 22 and has a shaft which extends through the bearing 22. The end region of the support member 23, which faces in the bore-forming direction has a flange portion 26 arranged adjacent to the receiving member 6. A spring member 25 extends between the flange portion 26 and the bearing 22. The spring member 25 is formed of a plurality of plate springs. The support member 23 has a central through-bore for conducting the cooling medium toward the borer 4. In order to prevent penetration of the cooling medium, which penetrates in the receiving region 21 through the bore 24, into the bearing 22, a seal is provided on a side of the bearing 22 opposite to the bore-forming direction. An annular indentation is provided in the end surface of the flange portion 26 of the support member 23. A seal 27, which is formed as an O-ring, projects partially into this indentation. This seal 27 prevents the cooling medium, which flows through the central bore of the support member 23, from reaching the bearing member 34.

Though the prevent invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A boring tool, comprising a housing part (3); means (35) for transmitting a rotational movement to a borer, the transmitting means (35) being supported in the housing part (3) and having a central receiving region (36) for receiving the borer (4); two, spaced from each other, bearing members (33, 34) for supporting the transmitting means (35) in the housing part (3); and means for enabling inclination of a longitudinal axis of the borer (4) relative to the longitudinal axis of the housing part (3), wherein the inclination enabling means comprises means for effecting inclination of a longitudinal axis of the central receiving region (36) of the transmitting means (35) together with the longitudinal axis of the borer (4).

2. A boring tool according to claim 1, wherein the inclination effecting means comprises means for offsetting at least one of the two bearing members (33, 34) in a direction transverse to a longitudinal axis of the housing part (3).

3. A boring tool according to claim 2, wherein the offsetting means comprises at least one offsetting member (53) arranged between the at least one of the two bearing members (33, 34) and the housing part (3).

4. A boring tool, comprising a housing part (3); means (35) for transmitting a rotational movement to a borer, the transmitting means (35) being supported in the housing part (3) and having a central receiving region (36) for receiving the borer (4); two, spaced from each other, bearing members (33, 34) for supporting the transmitting means (35) in the housing part (3); and means for enabling inclination of a longitudinal axis of the borer (4) relative to the longitudinal axis of the housing part (3), wherein the inclination enabling means comprises at least one elastic support member (44, 45).

5. A boring tool, comprising a housing part (3); means (35) for transmitting a rotational movement to a borer, the transmitting means (35) being supported in the housing part (3) and having a central receiving region (36) for receiving the borer (4); two, spaced from each other, bearing members (33, 34) for supporting the transmitting means (35) in the housing part (3); and means for enabling a wobbling movement of the borer about an imaginary pivot point formed by a borer end facing in a bore-forming direction.

* * * * *